(12) United States Patent
English et al.

(10) Patent No.: US 9,519,314 B2
(45) Date of Patent: *Dec. 13, 2016

(54) INTRINSICALLY SAFE CASE FOR A TABLET COMPUTER

(71) Applicant: IDS GLOBAL, INC., Montgomery, TX (US)

(72) Inventors: Stuart John English, Rancho Santa Margarita, CA (US); William Jack McNeish, III, Newport Beach, CA (US)

(73) Assignee: IDS GLOBAL, INC., Montgomery, TX (US)

( * ) Notice: Subject to any disclaimer, the term of this patent is extended or adjusted under 35 U.S.C. 154(b) by 51 days.

This patent is subject to a terminal disclaimer.

(21) Appl. No.: 14/619,797

(22) Filed: Feb. 11, 2015

(65) Prior Publication Data

US 2016/0231786 A1    Aug. 11, 2016

(51) Int. Cl.

| G06F 1/16 | (2006.01) |
|---|---|
| G06F 1/20 | (2006.01) |
| H01R 24/60 | (2011.01) |
| H01R 13/73 | (2006.01) |
| H01R 13/24 | (2006.01) |

(Continued)

(52) U.S. Cl.
CPC .......... *G06F 1/1656* (2013.01); *G06F 1/1626* (2013.01); *G06F 1/1632* (2013.01); *G06F 1/203* (2013.01); *H01R 13/2421* (2013.01); *H01R 13/73* (2013.01); *H01R 24/60* (2013.01); *H01R 43/24* (2013.01); *H01R 2107/00* (2013.01)

(58) Field of Classification Search
CPC .... G06F 1/1656; G06F 1/1626; G06F 1/1632; G06F 2200/1633; G06F 1/1628; G06F 1/1616;G06F 1/1637; G06F 1/166; G06F 1/1681; G06F 1/1669; G06F 1/1686; G06F 1/16; G06F 1/163; G06F 1/1635; G06F 1/1677; G06F 1/181; G06F 1/1601; G06F 1/1633; G06F 1/1652; G06F 1/1654; G06F 1/1673; G06F 1/1679; G06F 1/1683; G06F 1/1688; G06F 1/1694; G06F 1/183; G06F 1/187; G06F 1/203; H01R 13/73; H01R 24/60; H01R 2107/00; H05K 5/0086; H05K 5/0017; H05K 5/00; H05K 5/02; H05K 5/0239; H05K 5/03; H05K 7/00

USPC ............ 361/679.56, 679.01, 679.55–679.58
See application file for complete search history.

(56) References Cited

U.S. PATENT DOCUMENTS

| 5,583,742 A | 12/1996 | Noda et al. |
|---|---|---|
| 8,503,170 B1 | 8/2013 | Hsu et al. |

(Continued)

*Primary Examiner* — Anthony Haughton
*Assistant Examiner* — Ingrid Wright
(74) *Attorney, Agent, or Firm* — Egbert Law Offices, PLLC

(57) ABSTRACT

A case for a tablet computer has an upper shell and a lower shell. The upper shell has an open area through which the screen of the tablet computer is exposed. The upper shell is in sealed relation against a periphery of the tablet computer. The lower shell is in sealed relation to the upper shell. A subframe is interposed in sealed relation between the upper shell and the lower shell. The subframe has an outer periphery aligned with an outer periphery of the upper shell and the lower shell. A finned member is affixed to the shells so as to transfer heat from the tablet computer outwardly of the shells. A plurality of pins are formed in the shell and are suitable for allowing electrical connection with the tablet computer.

19 Claims, 7 Drawing Sheets

(51) Int. Cl.
*H01R 107/00* (2006.01)
*H01R 43/24* (2006.01)

(56) References Cited

U.S. PATENT DOCUMENTS

| | | | |
|---|---|---|---|
| 2012/0099261 A1* | 4/2012 | Reber | G06F 1/1632 |
| | | | 361/679.3 |
| 2012/0314354 A1 | 12/2012 | Rayner | |
| 2013/0193149 A1 | 8/2013 | Balourdet | |
| 2013/0235521 A1* | 9/2013 | Burch | G06F 1/1635 |
| | | | 361/679.48 |
| 2014/0098485 A1* | 4/2014 | Vahid | G06F 1/1632 |
| | | | 361/679.41 |
| 2014/0152890 A1* | 6/2014 | Rayner | G06F 1/1626 |
| | | | 348/376 |

* cited by examiner

INTRINSICALLY SAFE CASE FOR A TABLET COMPUTER

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to cases for tablet computers. More particularly, the present invention relates to cases for tablet computers in which the tablet computer is entirely sealed within the case. The present invention also relates to audit tools that employ tablet computers.

2. Description of Related Art Including Information Disclosed Under 37 CFR 1.97 and 37 CFR 1.98.

The use of handheld computers in hazardous areas may lead to an increased risk of fire or explosion triggered by the presence of electricity in the handheld computer. The handheld computer could serve as an ignition source in an area containing flammable fluids or vapors. As such, handheld computers are restricted from use in such hazardous areas. Any electrical devices used in such hazardous areas are often required to be certified according to the requirements specified in that particular field.

Hazardous environments are classified into three classes. Each of these classes focuses on the different types of hazardous materials that are in the immediate area. As such, the handheld computers, or tablet computers, must be able to satisfy certain of these classification groups. In particular, Class 1 areas will include flammable gases or vapors that are present in the air in sufficient quantities to produce an explosion in the event of an ignition source. Class 2 areas are related to the presence of combustible dust. Class 3 areas include ignitable fibers or materials that are too heavy to be suspended in air in sufficient quantities to produce an ignition.

Each of these classes is divided into separate divisions that are based upon the likelihood that hazardous materials will be present. Division 1 includes hazardous environments where pertinent hazardous material, such as vapor, dust and fibers, is present during normal conditions. Division 2 relates to hazardous environments in which the flammable material will be present only in unusual or a fault conditions.

With respect to handheld computers, such as tablet computers, it is important to be able to satisfy the Class 1 Division 1 standards. If the handheld computer satisfies these requirements, then it would be UL-certified as "intrinsically safe". So as to satisfy the Class 1 hazardous environment classification, the tablet computer must have an explosion-proof enclosure or assembly which prevents any shorts, sparks, or other events from escaping outside of the enclosures. With respect to flammable vapors, the handheld computer must have a case that effectively prevents entry of flammable materials into the enclosure. Relative to Class 2 areas, the tablet computer must have a dust-ignition proof enclosure which prevents ignitable materials from entering the enclosure. If the ignitable materials would enter the enclosure, they could be subject to the ignition arcs, sparks or heat within the enclosure. As such, the enclosure should be entirely sealed around the tablet computer and the case should block any penetrations.

In order to be an effective tool for use in Class 1 Division 1 environments, the tablet computer should be provided within a case that avoids any possible creation of arcs or sparks on the exterior of the enclosure while, at the same time, avoiding any openings or penetrations whereby flammable gases or dusts could enter the interior of the enclosure.

A major problem associated with the use of tablet computers having an entirely sealed carrying case is the fact that the will build up in the interior of the case. When heat builds up in the interior of the case, there is a need to be able to properly vent this heat to the ambient environment. However, entirely sealed cases lack the ability to vent. As such, a need has developed so as to provide a case for a tablet computer which avoids any penetrations while, at the same time, allowing for heat dissipation and release.

Also, in the past, tablet computers have not been available for Class 1 Division 1 use since the tablet computers have various connections. These connections can be in the nature of USB ports, sockets, and other elements. Whenever sockets are used, there is a penetration which would allow for gases and dust to enter the interior of the tablet computer. When USB ports are utilized, there is a possibility of a spark or arc occurring whenever an electrical connection is made. As such, there is a need to develop a case for tablet computer which avoids the use of the USB ports and sockets.

While assemblies or enclosures have been developed for use in such Class 1 Division 1 areas, these components are often expensive and not configured for use with particular electrical devices, such as tablet computers. Also, these components may only satisfy the requirements for a particular class and division and would not be suitable for use in the other hazardous environments, such as Division 2 conditions. Thus, there is a need for any intrinsically safe or explosion-proof case for a tablet computer that is capable of being safely used in varying types of conditions and hazardous environments.

Whenever a tablet computer is normally utilized, there is a possibility of damage to the tablet computer. This can occur by encountering water or by being dropped on a surface. The dropping of the tablet computer on a surface can crack the glass of the tablet computer and damage the body of the computer. The if the tablet computer should be dropped in water, then water can ingress through the openings in the tablet computer so as to damage the internal components. As such, a need has developed so as to provide a case for a tablet computer that avoids damage to the tablet computer.

In the past, cases that have been provided for tablet computers. These cases have been formed of a polymeric material. Unfortunately, these cases have often sharp corners that can be easily cracked or damaged if the tablet computer is dropped. In other circumstances, the plastic material will encounter a sharp object when it is dropped and also tend to crack. Whenever cracks occur, the case of the tablet computer would not be considered to be "intrinsically safe". As such, a need has developed so as to avoid any possible damage to the tablet computer caused by dropping onto a hard surface or into water.

In the past, various patents and patent publications have issued relating to cases for tablet computers. For example, U.S. Pat. No. 5,583,742, issued on Dec. 10, 1996 to Noda et al., describes a computer with a protective cover having outwardly projecting cushioning portions. In particular, this device employs a body case that houses a display. An outer member is formed of an impact-resistant material integrally formed on the outside surface of the body case. An outwardly-projecting cushioning portion is formed at each corner of the outside member. Each of the cushioning portions has a first protective portion extending outwardly from the body case and a second protective portion projecting curvilinearly with respect to the first protective portion and extending onto a surface or a back of the body case. Vent holes are formed in the body case which are sealed with a porous film. The vent holes provided an escape path for gas produced by the battery in the event that the battery explodes within the body case.

U.S. Pat. No. 8,503,170, issued on Aug. 6, 2013 to Shu et al., shows a waterproof and shockproof cover for a pad computer. The cover includes an upper housing, a base housing, a glass, a first rubber ring, a second rubber ring and four shockproof elements. The base housing corresponds to the upper housing. The upper housing comprises a first connection and the base comprises a second connection corresponding to the first connection so as to allow for the fastening of the base housing to the upper housing. The upper housing includes a viewing window hole and a first groove formed around the rim of the viewing hole. A first rubber ring is disposed within the first groove. The glass covers the viewing window hole and the first rubber ring. The four shockproof elements are disposed respectively at the four corners of a rectangular accommodation space of the base housing so as to bear the computer therein.

U.S. Patent Publication No. 2012/0314354, published on Dec. 13, 2012 to G. Rayner, describes a housing for encasing a tablet computer. The apparatus includes a housing that is configured such that the device may be fitted within the housing so as to be protected from shocks and liquid. The housing includes top and bottom members that may be removably coupled together so as to form the housing. Each top and bottom member includes a perimeter portion defined by proximal and distal ends and opposing sides. The top and bottom members include respective clasping mechanisms that extend along the perimeter of the top and bottom members that are configured for engaging a third clasping mechanism, such as a locking comb or wedge feature. The clasping mechanisms are configured for coupling the top and bottom members with one another so as to seal the housing.

U.S. Patent Publication No. 2013/0193149 describes an enclosure for a tablet computer that includes a first portion and a second portion. The first portion and the second portion are configured to be releasably coupled to each other. The enclosure has an assembled configuration having an internal chamber. The enclosure is configured to house the tablet computer within the internal chamber.

It is an object of the present invention to provide a case for a tablet computer that satisfies Class 1 Division 1 requirements.

It is another object of the present invention to provide a case for a tablet computer that has no ingress areas or penetrations whereby flammable or hazardous material can enter the interior of the case.

It is another object of the present invention to provide a case for a tablet computer that allows for heat dissipation without the need for fans or penetrations into the case.

It is another object of the present invention to provide a case for a tablet computer that can maintain a positive pressure within the interior of the case so as to prevent liquids and other gases from entering the interior of the case.

It is another object of the present invention to provide a case for a tablet computer that includes intrinsically safe pin connections for the tablet computer.

It is another object of the present invention to provide a case for a tablet computer that is easily readable.

It is a further object of the present invention to provide an apparatus which is intrinsically safe, explosion-proof, and liquid-tight.

It is still a further object of the present invention to provide an apparatus that effectively avoids cracking and damage to the case or the tablet computer in the event of dropping or other damaging contact.

It is still a further object of the present invention to provide an apparatus that facilitates the ability to carry out audits in hazardous environments.

It is still further object of the present invention to provide an apparatus which facilitates the ability to download data from the tablet computer.

These and other objects and advantages of the present invention will become apparent from a reading of the attached specification and appinded claims.

BRIEF SUMMARY OF THE INVENTION

The present invention is an apparatus that comprises a tablet computer having a screen and an outer periphery, an open shell having an open area, and a lower shell in connected and sealed relation to the upper shell. The screen of the tablet computer is exposed through the open area of the upper shell. The upper shell is sealed against the periphery of the tablet computer. The upper shell and the lower shell contain the tablet computer therein.

A subframe is interposed in sealed relation between the upper shell and the lower shell. The subframe has an outermost periphery aligned with an outer periphery of the upper shell and the lower shell. The subframe has a generally rectangular configuration surrounding an open interior. The tablet computer is positioned in the open interior of the subframe. The subframe has curved slots respectively formed adjacent corners of the generally rectangular configuration of the subframe. The subframe has slotted areas formed in a location between the corners of the rectangular configuration. In particular, each of the curved slots has a first end and a second end. Each of the curved slots has a width dimension that narrows at the first end and at the second end. The slotted areas each have a first end and a second end. Each of the slotted areas has a width dimension that narrows at the first end and the second and.

At least one of the upper shell and the lower shell has a valve affixed thereto. This valve is suitable for allowing a gas to be introduced under pressure into the interior of the upper and lower shells. The gas is, in particular and preferably, nitrogen.

A finned member is affixed at least one of the upper shell and the lower shell. The finned member is in heat transfer relation to the tablet computer so as to transfer heat outwardly of the shells.

A plurality of pins are formed on at least one of the upper shell and the lower shell. Each of the plurality of pins is in sealed relation with material forming the shells. The plurality of pins have an interior end that is connected to the tablet computer. The plurality of pins have an external end that extends outwardly of the shell. A plurality of channels are formed in the shell. The plurality of channels substantially surround respectively the plurality of pins such that the pins are recessed within the channels. The plurality of pins includes at least one first pin that is connected to a power supply. The power supply is positioned within the lower shell and is connected to the tablet computer. The plurality of pins includes at least one second pin that defines a USB serial bus and is connected to the tablet computer. Additionally, the plurality of pins includes at least one third pin that is a sensor that selectively removes power to the first and second pins or applies power to the first and second pins.

Each of the upper shell and the lower shell has a generally rectangular shape with radiused corners. The subframe has corners that a radiused so as to correspond to the radiused corners of the upper and lower shells. The subframe is formed of an aluminum material. The upper shell and the lower shell are each formed of a fiber-impregnated polymeric material. A metal seal is interposed between the periphery of the tablet computer and a surface of the upper shell adjacent to the open area. The upper shell and the lower shell and the subframe are in fluid-tight sealed relationship. A supply of nitrogen fills an interior of the upper shell and the lower shell. The supply of nitrogen is at at least atmospheric pressure.

A docking station is provided having an interior. The tablet computer and the upper shell and the lower shell are receivable within the docking station. The docking station has a plurality of pin connectors positioned therein. The plurality of pins connectors matingly correspond the plurality of pins when the docking station receives the tablet computer and the upper shell and the lower shell therein. The docking station comprises, in particular, includes a body and a lid hingedly connected to the body. The lid is movable between an open position and a closed position within the body.

In the present invention, the lower shell can have a camera lens affixed in sealed relationship thereto. The camera lens is cooperative with the tablet computer.

This foregoing Section is intended to describe, with particularity, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
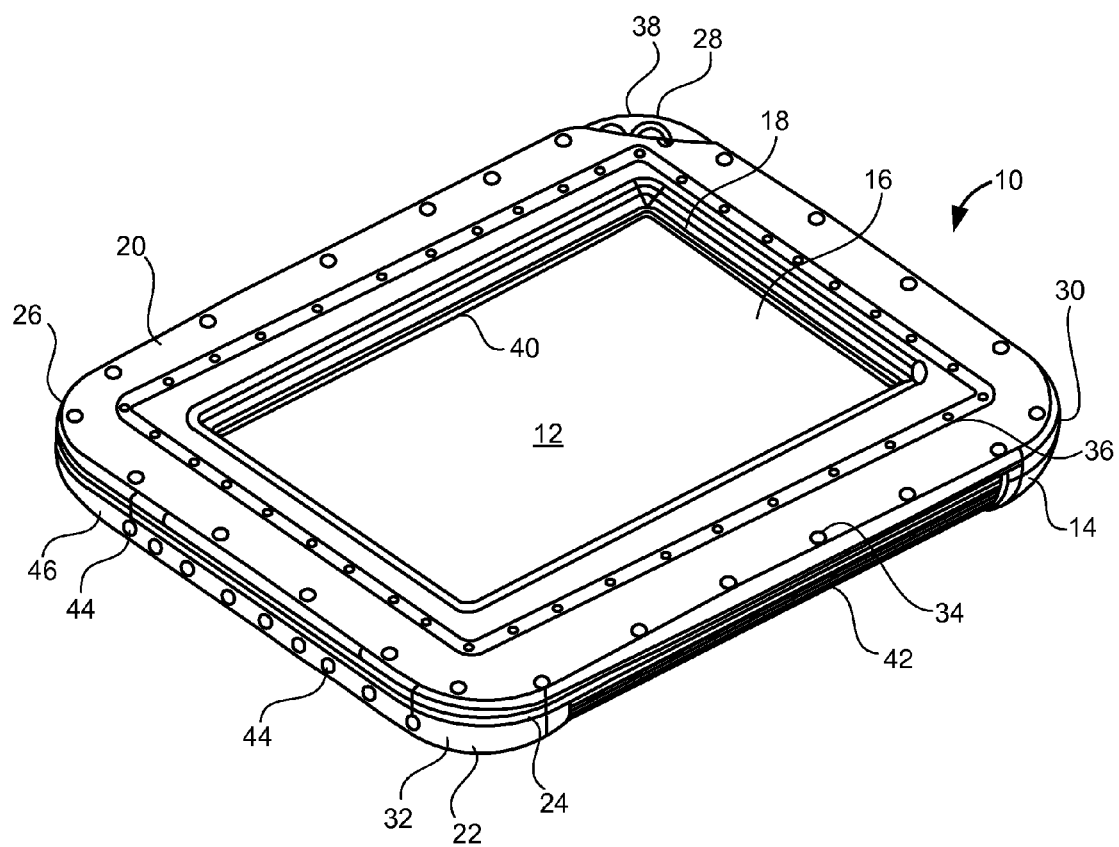
FIG. 1 is a perspective view of the apparatus of the present invention.

Referring to FIG. 1, there is shown the apparatus 10 in accordance with the teachings of the present invention. The apparatus 10 has a tablet computer 12 and a case 14. It can be seen that the screen 16 of the tablet computer 12 is exposed through an open area 18 of the case 14. As such, the case 14 acts to support the tablet computer 12 such that the tablet computer 12 can be used in various environments, including Class 1, Division 1 environments.

The case 14 includes an upper shell 20, a lower shell 22 and a subframe 24. The upper shell 20, the lower shell 22 and the subframe 24 are connected together such that the subframe 24 is sandwiched between the upper shell 20 and the lower shell 22. The upper shell 20, the subframe 24 and the lower shell 22 are connected together so as to be in generally fluid-tight sealed relationship. Each of the upper shell 20, lower shell 22 in the subframe 24 has a generally rectangular configuration with radiused corners 26, 28, 30 and 32. Importantly, in the present invention, the radiused corners 26, 28, 30 and 32 are configured so as to avoid sharp corners. It is known that sharp corners, when they encounter a hard surface, can tend to fracture. The radiused corners, on the other hand, serve to distribute the force of impact over a wider area and, tend to minimize the force of contact. As such, the use of radiused corners 26, 28, 30 and 32 is particularly configured to minimize any possible damage to the case 14 in the event that the case 14 is dropped onto a hard surface.

In FIG. 1, it can be seen that there are a plurality of fasteners, such as fasteners 34 and 36 which serve to affix the upper shell 20, the lower shell 22 and the subframe 24 together. These fasteners can be in the nature of screws. However, wide variety of other fasteners could also be used so as to properly secure the upper shell 20, the lower shell 22 and the subframe 24 together. There is a portion 38 of the subframe 24 that extends outwardly at radiused corner 28. Otherwise, substantially the entire periphery of the subframe 24 is aligned with the periphery of the upper shell 20 and the lower shell 22. It is the intention that the subframe 24 be made of a more rigid material, such as aluminum, than the material of the upper shell 20 and the lower shell 22. This harder material of the subframe further enhances resistance against possible damage to the case 14. The use of the subframe 24 reinforces the strength of the case 14 and, as will be described hereinafter, further enhances the shock-absorbing effect. The outwardly extending portion 38 of the subframe 24 can include certain holes that can be used so as to receive items, such as rings, pins, styluses, or other items thereon.

In FIG. 1, the tablet computer 12 has an outer periphery. The open area 18 of the upper shell 20 exposes the screen 16 of the tablet computer 12 in an area away from this outer periphery. There is a portion of the upper shell 20 that overlies the outer periphery of the tablet computer 12. This portion will be in sealed fluid-type relationship with the outer periphery of the tablet computer 12. Importantly, a seal 40 will be interposed between the portion of the upper shell 20 at the upper periphery of the tablet computer 12 and the outer periphery of the tablet computer 12. This seal 40 should be in the nature of a metal seal, such as a copper seal. It is important that a metal seal be used so that it does not degrade when exposed to hazardous, caustic or corrosive environments. If a rubber seal were used in place of the metal seal 40, there is a possibility that, over time, the rubber seal could degrade to the extent that it did not maintain the proper fluid-tight integrity.

In FIG. 1, it can be seen that the tablet computer 12 is effectively sealed within the case 14. The sealing of the tablet computer 12 within the case 14 can prevent any hazardous or flammable gases or particulate matter from entering the interior of the case 14. Additionally, the upper shell 20 and the lower shell 22, formed of a fiber-impregnated polymeric material, are extremely strong so as to be resistive of any damaging impacts that could be caused by contacts with exterior surfaces. Additionally, the subframe 24 further facilitates the shock-absorbing effect of the structure of the case 14 relative to the tablet computer 12. As such, the tablet computer 12 is effectively enclosed within the case 14 in a shock-resistant manner.

The case 14 is entirely sealed in the present invention. There are no penetrations into the interior of the case 14. As such, there is no area whereby hazardous gases or particulate matter could enter the interior of the case. Since the case 14 is entirely sealed, there is no possibility of a spark that would occur in the interior of the case 14 or in the interior of the tablet computer 12 from igniting any flammable materials in the vicinity of the apparatus 10.

A finned member 42 is positioned on one side of the case 14. The finned member 42 will be in heat transfer relationship with the interior of the case 14 and with the tablet computer 12. The finned member 42 can be formed of a heat-conductive material, such as aluminum. As such, as heat develops on the interior of the case 14, the heat can be dissipated because the heat will transfer to the finned member 42. The use of the finned member 42 further enhances the effect of the present invention by maintaining a proper temperature within the interior of the case 14. This proper temperature serves to improve the life of the tablet computer 12 and avoids any interior temperatures of the case 14 that could create a flammable condition. Additionally, the use of the finned member 42 avoids the use of other heat-dissipating devices, such as fans, air holes or vents. The finned member 42 will be in sealed relationship with the material that is used to form the lower shell 22. As such, there is no possibility of any penetrations occurring in this area. As will be described hereinafter, the finned member 42 includes a central core with a plurality of fins radiating outwardly therefrom. Each of the fins will extend horizontally along the length of the side of the case 14. The use of the horizontal fins on the finned member 42 also improves the ability to grip the case 14.

In FIG. 1, it can be seen that there are a plurality of channels 44 formed along side 46 of the case 14. Channels 44 are utilized so as to allow pins to be positioned therein. The channels 44 substantially surround each of the pins. As will be described hereinafter, each of the pins is provided so as to allow for an electrical connection to be established within the interior of the case. Each of the channels 44 is in the nature of a slot that opens at the bottom and is covered at the top. Each of the channels 44 is formed in the lower shell 22.

Figure 2:
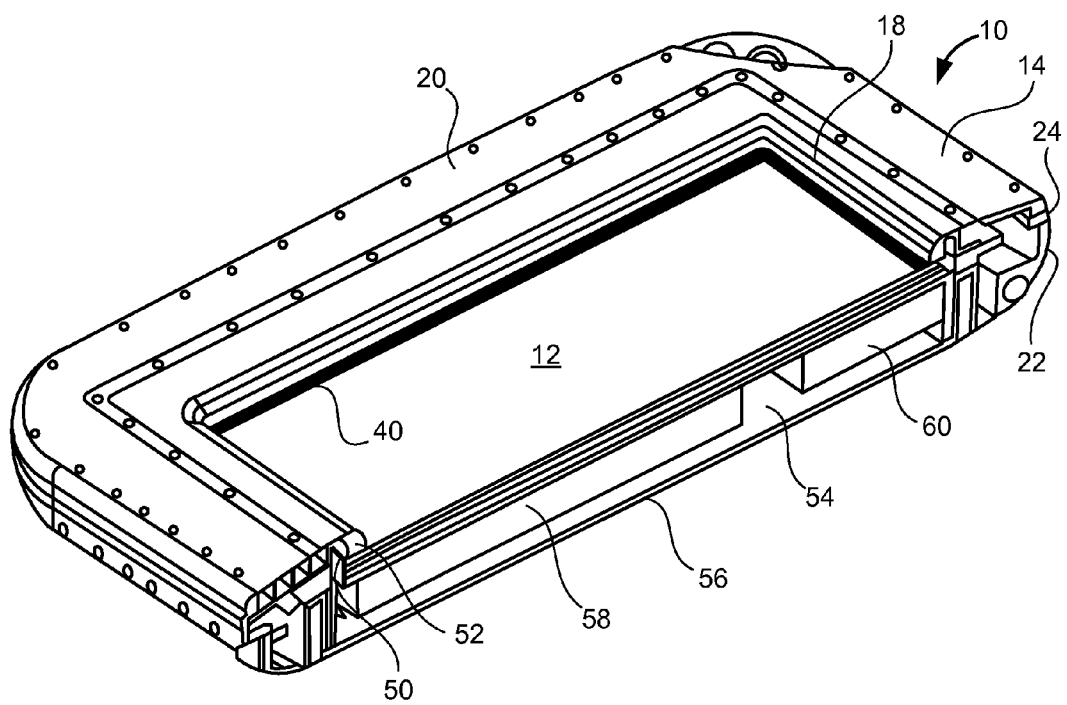
FIG. 2 is a cutaway view lengthwise of the apparatus of the present invention.

FIG. 2 shows the apparatus 10 with a cutaway view extending lengthwise across the apparatus 10. In FIG. 2, it can be seen that the tablet computer 12 is positioned within the open area 18 of the upper shell 20. In FIG. 2, the tablet computer 12 includes an outer periphery 50. The upper shell 20 includes a portion 52 which overlies the outer periphery 50 of the tablet computer 12. It can further be seen that the metal seal 40 will be interposed between the portion 52 and the outer periphery 50 of the tablet computer 12. As such, the fluid-tight relationship between the upper shell 20 and the tablet computer 12 is established.

The lower shell 22 defines an interior volume 54 between the bottom 56 of the lower shell 22 and the bottom of the tablet computer 12. This interior volume 54 is suitable for receiving various electrical components associated with the tablet computer 12. In particular, this interior volume can be utilized so as to receive certain items, such as a battery 58 and telecommunications equipment 60. Various other components can also be received within this interior volume 54. Importantly, in the present invention, is intended that this interior volume 54 be filled with a gas, such as carbon dioxide or nitrogen. In particular, this gas should be at a pressure greater than atmospheric. As a result, a positive pressure is created within the interior volume 54 of the case 14. The use of a gas, such as nitrogen, can purge any oxygen from the interior volume 54. The positive pressure will be resistive of any gases which would attempt to penetrate into this interior volume 54. If necessary, suitable sensors can be incorporated into the interior volume 54 so as to assure that this positive pressure (above atmospheric) is monitored and maintained.

In FIG. 2, the subframe 24 is illustrated as sandwiched between the upper shell 20 and the lower shell 22. As will be described hereinafter, the subframe 24 includes an open interior. The tablet computer 12 can be retained within this open interior of the subframe 24.

Figure 3:
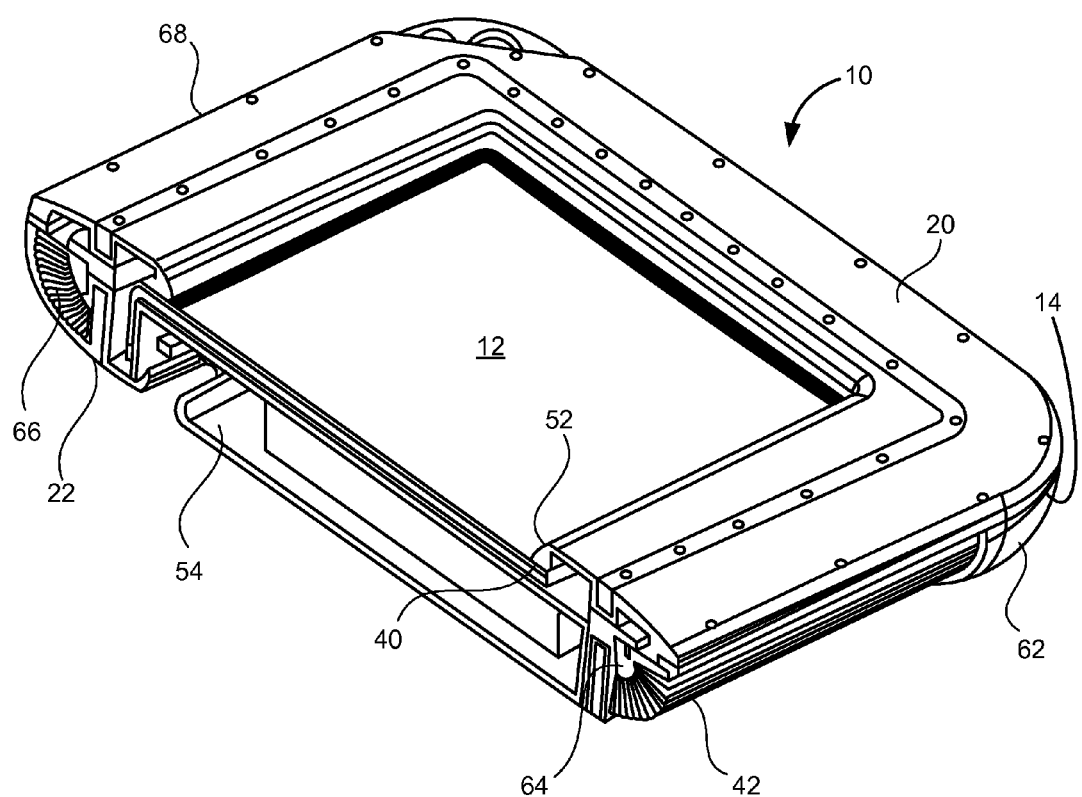
FIG. 3 is a cutaway view widthwise of the apparatus of the present invention.

FIG. 3 shows another cutaway view of the apparatus 10 taken widthwise across the apparatus. In FIG. 3, the sealing relationship between the portion 52 of the upper shell 20, the tablet computer 12 and the metal seal 40 can be easily seen. In FIG. 3, the finned member 42 is illustrated as positioned at the side 62 of the case 14. The finned member 42 has its outer periphery inset of the outer periphery of the case 14. As such, this serves to generally prevent any damage to the finned member 42 by contact with the exterior surfaces. The finned member 42 includes a plurality of longitudinal fins radiating outwardly from a central core 64. The central core 64 will be an heat transfer relationship with the interior volume 54 of the lower shell 22 and with the tablet computer 20. As such, the finned member 42 further facilitates the dissipation and release of heat. Another finned member 66 is located at the opposite side 68 of the case 14. Finned member 66 has a configuration similar to that of finned member 42 and will operate in a similar manner to dissipate and remove heat from the interior of the case 14.

Figure 4:
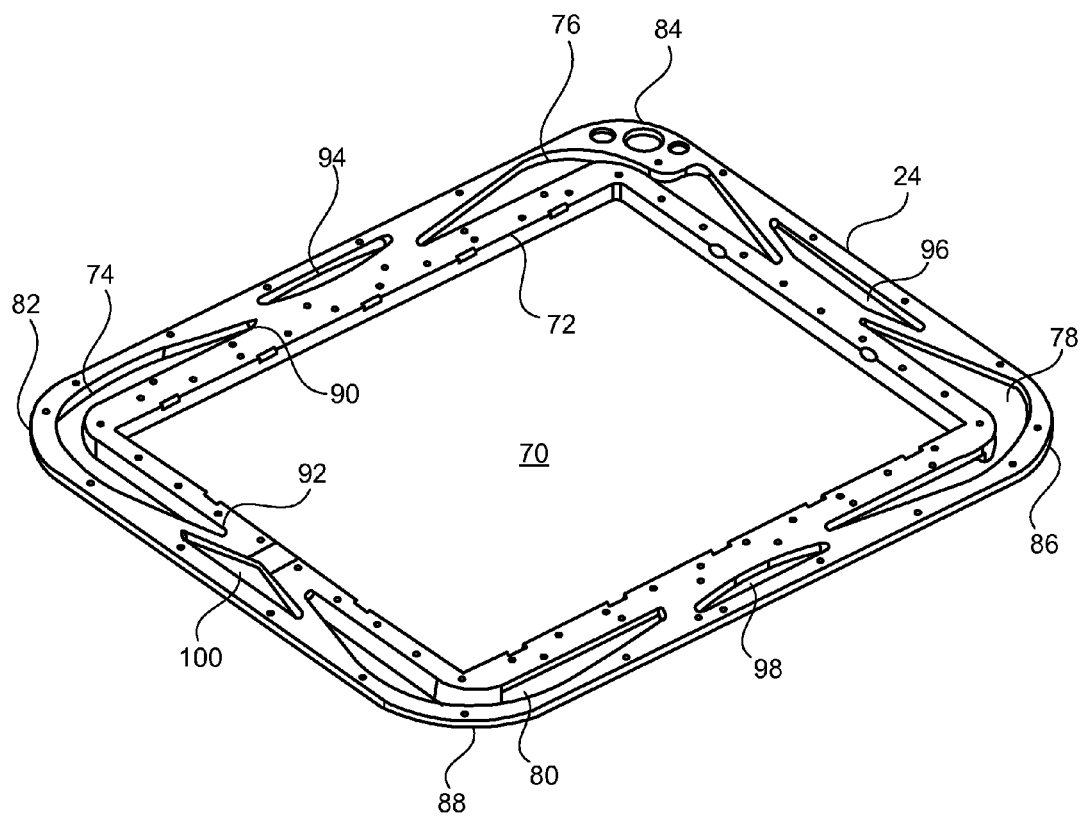
FIG. 4 is an isolated view of the subframe as used in the apparatus of the present invention.

FIG. 4 illustrates the subframe 24. The subframe 24 of the present invention is a very important component. The subframe 24 has been particularly developed so as to avoid, minimize, or prevent damage to the case 14. The subframe 24 has been particularly configured so as to have enhanced shock-absorbing capabilities. The particular configuration of slots formed in the subframe 24 creates a spring-like effect which serves to dissipate shocks throughout the subframe 24. As a result, the transmission of shocks throughout the upper shell 20 and the lower shell 22 and to the tablet computer 12 is effectively minimized.

In FIG. 4, the subframe 24 has an open interior 70. In normal use, the tablet computer 12 will be received within this open interior 70. The edges 72 which define this open interior 70 will be spaced from or insulated from the edges of the tablet computer 12 so that any shocks encountering the subframe 24 are not transmitted to the tablet computer.

The subframe 24 has a generally rectangular configuration with radiused corners. There are curved slots 74, 76, 78 and 80 that are formed through the thickness of the subframe 24 at the corners 82, 84, 86 and 88 respectively. These curved slots 74, 76, 78 and 80 have a unique configuration. Each of the slots 74, 76, 78 and 80 has a first end 90 and a second end 92. The width of each of the slots will narrow toward these ends 90 and 92. As a result, when a shock is received at the corners 82, 84, 86 and 88 of the subframe 20, the slots 74, 76, 78 and 80 will create a spring-like effect so as to cushion the shock. The narrowing of the slot toward the ends 90 and 92 will tend to cause any shock forces to be directed toward the ends 90 and 92 and be absorbed by the subframe 24 while minimizing further transmission to the upper shell 20, the lower shell 22 or the tablet computer 12.

Additionally, the subframe 24 includes slotted areas 94, 96, 98 and 100. Each of the slotted areas 94, 96, 98 and 100 has a generally triangular shape with the wide portion of the triangle being adjacent to the outer periphery of the subframe 24. As such, each of the slotted areas 94, 96, 98 and 100 will have a first end and a second end such that the width of the slots will narrow toward these ends. These slotted areas 94, 96, 98 and 100 will tend to dissipate any shocks to the particular sides of the subframe 24 in a direction toward the material of the subframe 24 and further dissipate any shocks from adversely affecting the tablet computer 12 or the case 14. As such, it can be seen that the subframe 24 is particularly configured to greatly enhance the shock-absorbing capabilities of the apparatus 10.

Figure 5:
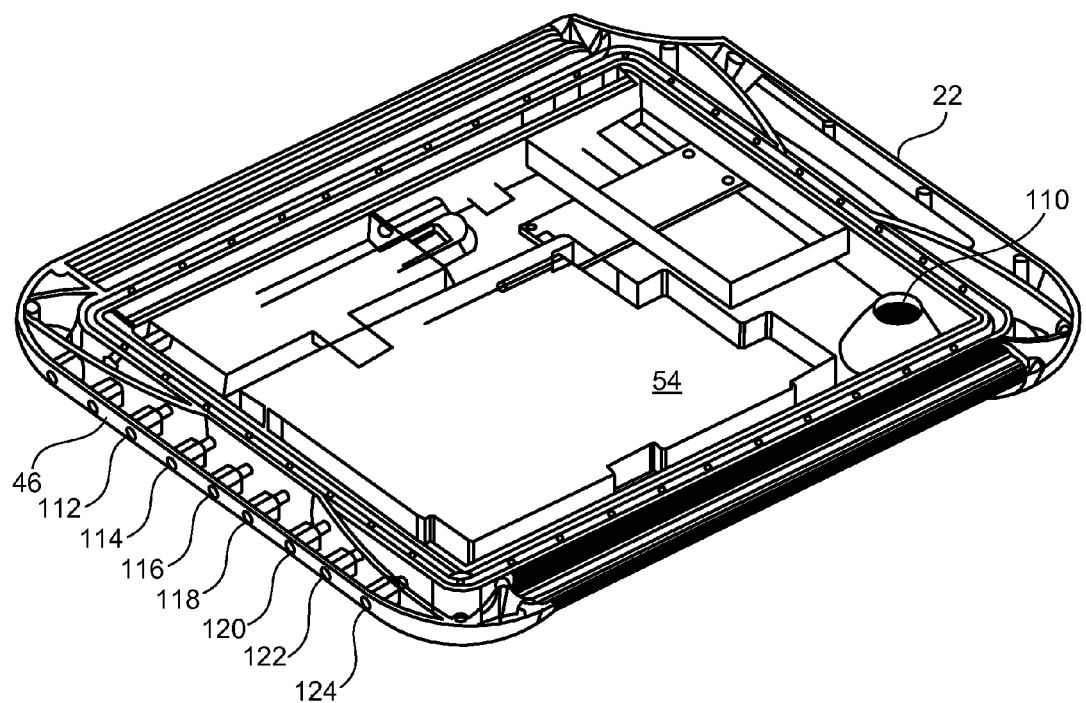
FIG. 5 is a perspective view showing the interior of the lower shell of the apparatus of the present invention.

FIG. 5 is an isolated view of the interior of the lower shell 22. The lower shell 22 defines the interior volume 54. It can be seen that there are a variety of components within lower shell 22, such as batteries, motherboards, and telecommunications equipment. It can be seen in FIG. 5 that there is a valve 110 that opens to the interior volume 54. The valve 110 allows nitrogen, or other gas, to be introduced into the interior volume 54.

There are a plurality of pins 112, 114, 116, 118, 120, 122, and 124 that are formed along the side 46 of the lower shell 22. Each of these pins 112, 114 to 116, 118, 120, 122 and 124 is molded with the material used to form the lower shell 22. In particular, the pins will have an interior end that is positioned in the interior volume 54 of the lower shell 22. Each of the pins has an exterior end that will extend into the channels 44 on the side 46. Since the pins 112, 114, 116, 118, 120, 122 and 124 are molded with the lower shell 22, there is no space or area in which gases can penetrate or liquids can penetrate. The use of the pins 112, 114, 116, 118, 120, 122 and 124 facilitates the ability for the apparatus 10 of the present invention to be utilized so as to communicate with the tablet computer 12.

Each of the pins will have certain functions. The first pins 112 and 114 are power supply pins. As such, when the apparatus 10 is suitably docked (as will be described hereinafter), power can be supplied to the tablet computer or the battery within the interior of the lower shell. In particular, a pin connector can engage with the first pins 112 and 114 so as to properly supply power.

Pins 114, 116, 118 and 120 form a USB serial bus. These second pins 114, 116, 118 and 120 can serve as a means for connecting the tablet computer for the transmission of data thereto or therefrom. As such, when the apparatus 10 is installed in a docking station, suitable pin connectors will join with pins 114, 116, 118, 120 and 122 so as to transmit data.

Importantly, the present invention includes a third pin 122. The third panel 122 is a sensor pin. Pin 122 will sense when the apparatus 10 is docked. If the apparatus 110 is not docked, then all power to the pins 112, 114, 116, 118 and 120 will be turned off. As such, even if the apparatus 10 would be submerged away from the docking station, there would be no possibility of shorting caused by conductivity between the various pins. When the apparatus 10 is docked, the sensor pin 122 will activate the pins 112, 114, 116, 118 and 120 so that the processes of power transmission and data transmission can be properly carried out. As soon as the apparatus 10 is removed from the docking station, sensor pin 122 will immediately turn off all power to the remaining pins.

Pin 124, along with various other pins, can be utilized for other purposes, such as telemetry or other processes. Within the concept of the present invention, the particular order or arrangement of the pins 112, 114, 116, 118, 120, 122 and 124 is not important. These pins can be that placed at various locations along the side 46 or on the lower shell 22.

Each of the pins 112, 114, 116, 118, 120, 122 and 24 is known as a "pogo pin". The use of such pins are very unique within the computing industry. These pins have only been used previously in the broadcast industry. Each of these pins is recessed in respective channels 44 so that possible damaging contact with exterior surfaces is avoided. Similarly, the channels tend to surround each of the pins so that it is not possible for a bridging effect between the pins to occur. Furthermore, since the pins are recessed within the channels, there is no possibility of a spark in the event that the side 46 should accidentally brushed against an exterior surface. Each of the pins is suitable for being joined to a pin connector in the docking station.

Figure 6:
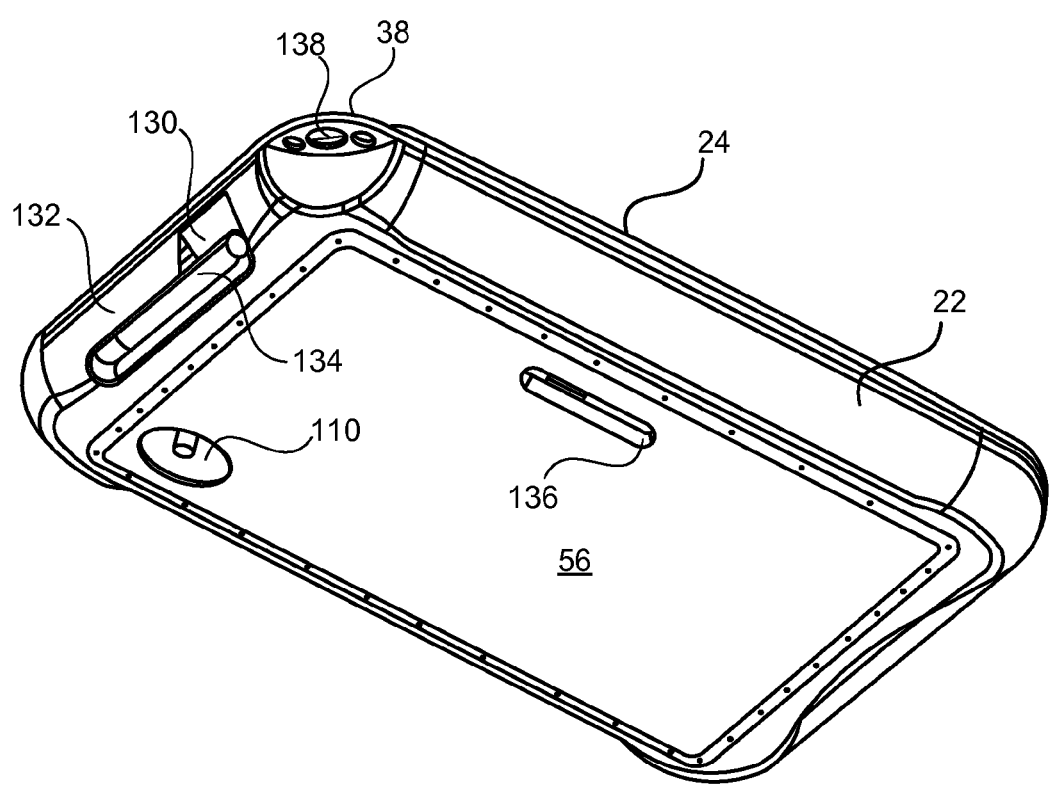
FIG. 6 is a bottom perspective view showing the lower shell of the apparatus of the present invention.

FIG. 6 shows a bottom view of the lower shell 22. The lower shell 22 generally has a flat bottom 56. The valve 110 opens to this flat bottom 56. As mentioned previously, valve 110 is suitable for receiving a supply of oxygen therein and suitable for releasing any oxygen from the interior of the case 14 caused by purging with the nitrogen gas. The lower shell 22 also includes a recess 130 formed at a side 132. Recess 130 is suitable for receiving a stylus 134 therein. Another recess or protrusion 136 is formed into the bottom surface 56. Recess or protrusion 136 facilitates the handling and gripping of the apparatus 10 and also facilitates proper installation into the docking station.

As mentioned previously, there is a portion 38 of the subframe 24 that extends outwardly of the periphery of the lower shell 22. There are plurality of holes 138 formed through this portion 38 of the subframe 24. The outer periphery of the lower shell 22 is actually recessed away from this portion 38. The holes 138 facilitate the ability to attach objects to the apparatus 10 or to allow the apparatus 10 to be supported on an exterior surface.

Figure 7:
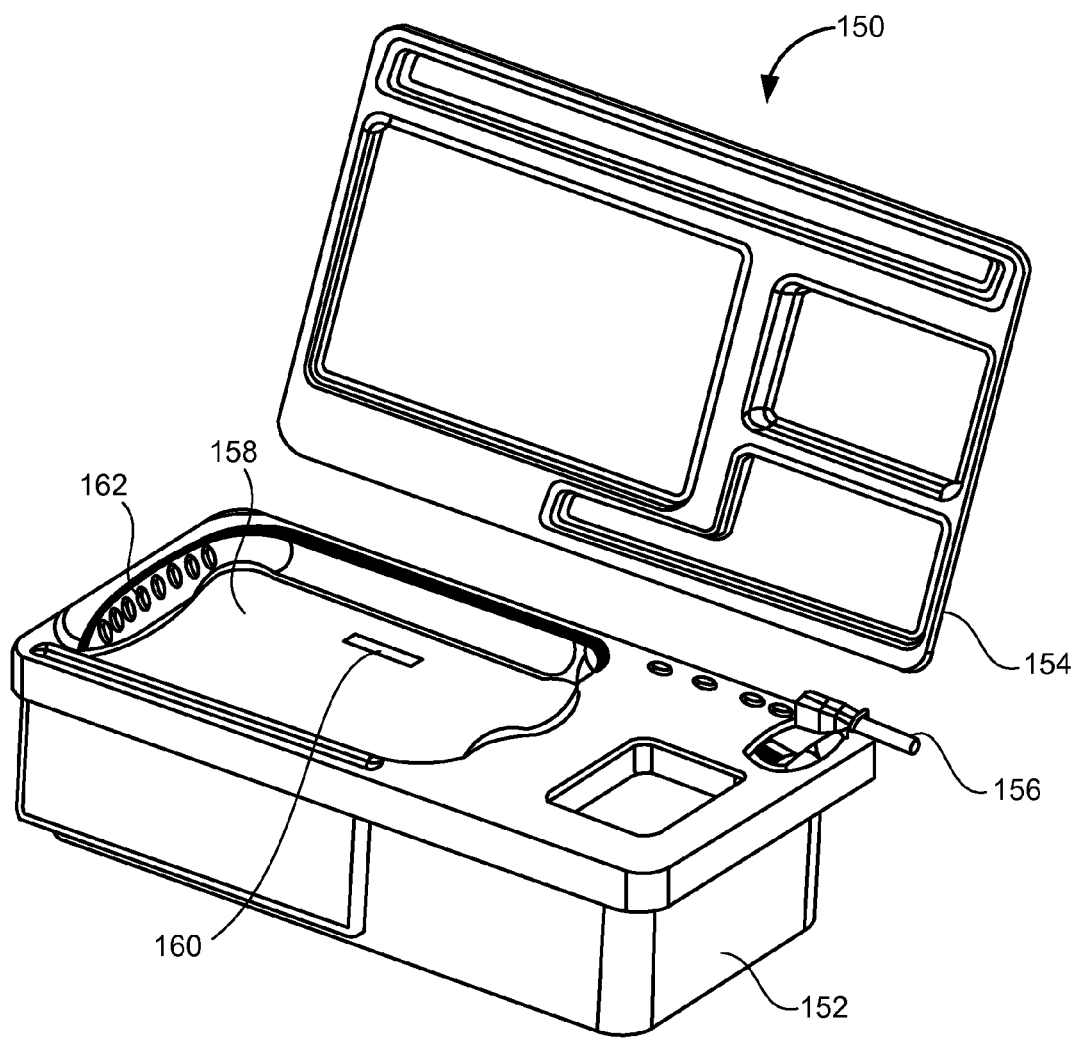
FIG. 7 is a perspective view showing the docking station of the apparatus of the present invention.

FIG. 7 illustrates the docking station 150 as used with the apparatus the present invention. Docking station 150 includes a body 152 with a lid 154 mounted by a hinge 156 to the body 152. The lid 154 is movable between an open positioned and a closed position.

The body 152 includes a recess 158 therein. Recess 158 is suitable for slidably receiving the case 14 therein. In particular, there is another recess or a protrusion 160 formed in the recess 158. This recess or protuberance can correspond with the recess or protrusion 136 of the lower shell 22 so as to assure that the case 14 will be in a proper position within the docking station 150. A plurality of pin connectors 162 are positioned within the body 152 of the docking station 150. Pin connectors 162 will automatically connect with the various pins of the apparatus 10 when the apparatus 10 is placed within the recess 158. Since the body 152 can include data processing equipment, power supplies, telemetry and telecommunications equipment, and other items, the apparatus 10 can be placed in the recess 150 so as to transmit or receive data, so as to be re-supplied with power, and to transmit to remote locations.

The apparatus 10 of the present invention can serve as a global audit tool. It is intrinsically safe and can be Class 1 Division 1 rated. The docking station 150 enhances and expands the full spectrum of communication, tablet performance, extended output and true global conductivity. This is carried out while ensuring intrinsic safety while in use. The software for the tablet computer can be a cloud-based, cross-referenced, audit protocol system. The present invention creates a hardware system that is of a revolutionary design for maximum function and durability. The tablet computer offers, in the preferred embodiment, a 10.1" HD 1920×1200 resolution screen that has 1500-2000 NIT brightness. It is internally augmented by an integrated LED lighting system that ensures for direct sunlight readability. This exceeds the standards of other devices that have 300 to 700 NIT and which are not truly readable in full daylight. The present invention utilizes a Windows 8 operating system and has for more capabilities than any tablet tools that are available. Since the apparatus 10 of the present invention is intrinsically safe, it is a fully operational digital audit tool that can be used by the oil and gas industry and by government regulatory agencies.

The apparatus 10 of the present invention following use or inserted into the docking station. The docking station is a multi-functional docking station that provides for emergency/reserve power supplies, quick recharging capability, enhanced communication via SATCOM, an internal Wi-Fi router, 4.0 broadband, and 4G LTE cellular communications. The docking station can also support a keyboard and multiple recharging capabilities, such as 110/240 volt, 12 volt, and solar panels. The docking station is packaged onto a carry-on size hardened IP 68/Mil Spec-rated briefcase for travel.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. An apparatus comprising:
   a tablet computer have a screen and an outer periphery;
   an upper shell having an open area, said screen being exposed through said open area, said upper shell being sealed against said periphery of said tablet computer;
   a lower shell being connected in sealed relation to said upper shell, said upper shell and said lower shell containing said tablet computer therein; and
   a subframe interposed in sealed relation between said upper shell and said lower shell.

2. The apparatus of claim 1, said subframe having an outermost periphery aligned with an outermost periphery of said upper shell and said lower shell.

3. The apparatus of claim 2, said subframe having a generally rectangular configuration surrounding and open interior, said tablet computer positioned in said open interior of said subframe.

4. The apparatus of claim 3, said subframe having curved slots respectively formed adjacent corners of said generally rectangular configuration, said subframe having slotted areas formed in a location between the corners of said rectangular configuration.

5. The apparatus of claim 4, each of the curved slots having a first end and a second end, each of the curved slots having a width dimension that narrows at said first end and at said second end, said slotted areas each having a first end and a second end, each of said slotted areas having a width dimension that narrows at said first end and said second end of said slotted areas.

6. The apparatus of claim 3, each of said upper shell and said lower shell having a generally rectangular shape with radiused corners, said subframe having corners that are radiused so as to correspond to the radiused corners of said upper and lower shells.

7. The apparatus of claim 1, said subframe being formed of an alumina material, said upper shell and said lower shell each being formed of a fiber-impregnated polymeric material.

8. The apparatus of claim 1, further comprising:
   a metal seal interposed between said periphery of said tablet computer and a surface of said upper shell adjacent to said open area.

9. The apparatus of claim 1, said lower shell having a camera lens affixed in sealed relation thereto, said camera lens being cooperative with said tablet computer.

10. An apparatus comprising:
    a tablet computer have a screen and an outer periphery;
    an upper shell having an open area, said screen being exposed through said open area, said upper shell being sealed against said periphery of said tablet computer; and
    a lower shell being connected in sealed relation to said upper shell, said upper shell and said lower shell containing said tablet computer therein, at least one of said upper shell and said lower shell having a valve affixed thereto, said valve suitable for allowing a gas to be introduced under pressure into an interior of said upper shell and said lower shell.

11. The apparatus of claim 10, further comprising:
    a finned member affixed at least one of said upper shell and said lower shell, said finned member being in heat transfer relationship to said tablet computer so as to transfer heat outwardly of said upper shell and said lower shell.

12. The apparatus of claim 10, further comprising:
    a plurality of pins affixed to at least one of said upper shell in said lower shell, each of said plurality of pins being in sealed relation with a material forming the shell, said plurality of pins having an interior end that is connected to said tablet computer, said plurality of pins having an external end that extends at least partially outwardly of the shell.

13. The apparatus of claim 12, further comprising:
    a plurality of channels formed in at least one of said upper shell and said lower shell, said plurality of channels substantially surrounding respectively said plurality of pins such that the pin is recessed within the channel.

14. The apparatus of claim 12, said plurality of pins comprising:

at least one first pin connected to a power supply, said power supply positioned within said lower shell and connected to said tablet computer;

at least one second pin defining a USB serial bus and connected to said tablet computer; and at least one third pin that is a sensor that selectively removes power to the first and second pins or applies power to the first and second pins.

15. The apparatus of claim 12, further comprising:

a docking station having an interior, said tablet computer and said upper shell and said lower shell being receivable within said docking station.

16. The apparatus of claim 15, said docking station having a plurality of pin connectors positioned therein, said plurality of pin connectors mating respectively with said plurality of pins when said docking station receives said tablet computer and said upper shell and said lower shell therein.

17. The apparatus of claim 15, said docking station comprising:

a body; and a lid hingedly connected to said body, said lid movable between an open position and a closed position with respect to said body.

18. An apparatus comprising:

a tablet computer have a screen and an outer periphery;

an upper shell having an open area, said screen being exposed through said open area, said upper shell being sealed against said periphery of said tablet computer; and a lower shell being connected in sealed relation to said upper shell, said upper shell and said lower shell containing said tablet computer therein; and a subframe interposed in sealed relation between said upper shell and said lower shell, said upper shell and said lower shell and said subframe being in fluid-tight sealed relationship.

19. The apparatus of claim 18, further comprising:

a supply of nitrogen filling an interior of said upper shell and said lower shell, said supply of nitrogen being at at least atmospheric pressure.

* * * * *